(12) United States Patent
Kotecha et al.

(10) Patent No.: US 8,774,211 B2
(45) Date of Patent: Jul. 8, 2014

(54) AUTONOMOUS NETWORK ACCESS CONGESTION AND COLLISION CONTROL

(75) Inventors: Lalit R. Kotecha, San Ramon, CA (US); Steven R. Rados, Danville, CA (US); Patricia Ruey-Jane Chang, San Ramon, CA (US); Vikram K. Rawat, San Ramon, CA (US); Yee Sin Chan, San Jose, CA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 240 days.

(21) Appl. No.: 12/979,547

(22) Filed: Dec. 28, 2010

(65) Prior Publication Data

US 2012/0163265 A1 Jun. 28, 2012

(51) Int. Cl.
*H04B 7/212* (2006.01)
*H04H 20/71* (2008.01)

(52) U.S. Cl.
USPC .......................................... 370/448; 370/312

(58) Field of Classification Search
USPC .......................................... 370/312–328, 448
See application file for complete search history.

(56) References Cited

U.S. PATENT DOCUMENTS

| | | | | |
|---|---|---|---|---|
| 6,243,832 | B1 * | 6/2001 | Eckes et al. | 714/33 |
| 2008/0232304 | A1 * | 9/2008 | Mooney et al. | 370/328 |
| 2008/0267126 | A1 * | 10/2008 | Vujcic et al. | 370/330 |
| 2009/0252125 | A1 * | 10/2009 | Vujcic | 370/336 |
| 2011/0274040 | A1 * | 11/2011 | Pani et al. | 370/328 |
| 2012/0039171 | A1 * | 2/2012 | Yamada et al. | 370/232 |
| 2012/0051297 | A1 * | 3/2012 | Lee et al. | 370/329 |

FOREIGN PATENT DOCUMENTS

WO WO 2009154352 A2 * 12/2009

\* cited by examiner

*Primary Examiner* — Kamal Divecha
*Assistant Examiner* — Shean Tokuta

(57) ABSTRACT

A mobile terminal receives a class identifier and receives a broadcast message with a backoff period definition for multiple classes of mobile terminals. The mobile terminal applies the class identifier to the backoff period definition to determine a backoff interval for the mobile terminal. The mobile terminal sends, to a base station, a radio resource control (RRC) connection request using the calculated backoff interval. Different backoff intervals are assigned to different classes of mobile terminals to control network access congestion at the base station.

14 Claims, 11 Drawing Sheets

US 8,774,211 B2

AUTONOMOUS NETWORK ACCESS CONGESTION AND COLLISION CONTROL

BACKGROUND

In mobile communications, radio frequency (RF) bottlenecks may occur when too many mobile terminals attempt to attach to a wireless access network at the same time. For example, an external event (e.g., a power failure, a system outage, a natural event, etc.) may cause multiple mobile terminals to lose a wireless connection and then simultaneously attempt to re-access the network. Mobile terminals that fail to establish a connection may automatically make repeated requests to re-access the network. Furthermore, the wireless access network may handle the setup of radio resource control (RRC) connections for each mobile terminal without preference to a type of device. Thus, mobile terminals for non-time-critical applications (e.g., machine-to-machine (M2M) communications) may compete for resources with other mobile terminals.

DETAILED DESCRIPTION OF PREFERRED EMBODIMENTS

The following detailed description refers to the accompanying drawings. The same reference numbers in different drawings may identify the same or similar elements.

Systems and/or methods described herein may adaptively and dynamically optimize a setting for RRC connection requests to avoid congestion and/or collisions during a network recovery. The systems and/or methods may define classes for mobile terminals. The classes may be based on, for example, particular types of mobile terminals, particular primary functions of the mobile terminals, or may be randomly assigned. The systems and/or methods may assign different backoff periods to the different classes of mobile terminals such that congestion during a mass network access event (e.g., due to a power failure, system outage, natural disaster, etc.) may be mitigated.

In one implementation, a mobile terminal may receive a class identifier and may receive a broadcast message with a backoff period definition for multiple classes of mobile terminals. The mobile terminal may apply the class identifier to the backoff period definition to determine a backoff interval for the mobile terminal. The mobile terminal may send, to a base station, a radio resource control (RRC) connection request using the calculated backoff interval.

Figure 1:
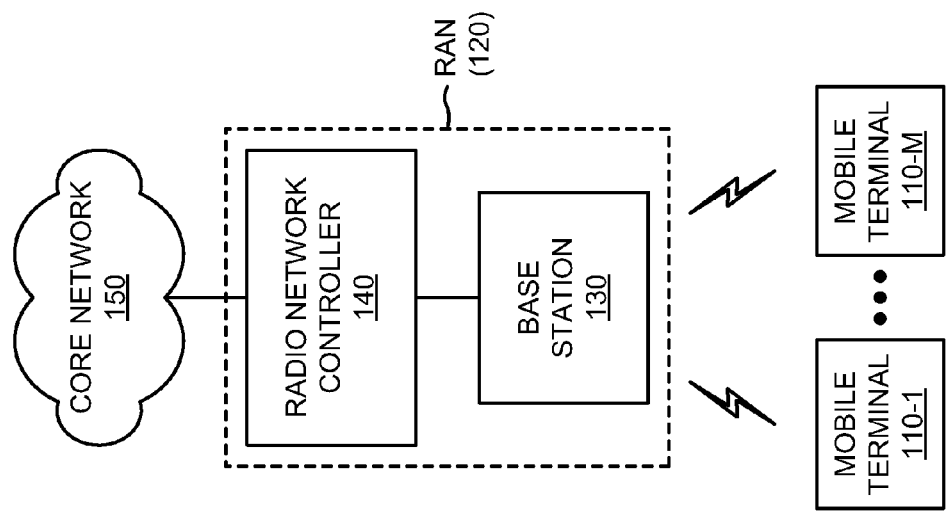
FIG. 1 is a diagram of an example network in which systems and/or methods described herein may be implemented.

FIG. 1 depicts a diagram of an example network 100 in which systems and/or methods described herein may be implemented. As shown, network 100 may include a group of mobile terminals 110-1 through 110-M (referred to collectively as "mobile terminals 110", and in some instances individually, as "mobile terminal 110"); a radio access network (RAN) 120 that includes a base station 130 and a radio network controller 140; and a core network 150. Two mobile terminals 110, one radio access network 120, one base station 130, one radio network controller 140, and one core network 150 have been illustrated in FIG. 1 for simplicity. In practice, there may be more mobile terminals 110, radio access networks 120, base stations 130, radio network controllers 140, and/or core networks 150. Also, in some instances, a component of network 100 may perform one or more functions described as being performed by another component or group of components of network 100.

Mobile terminal 110 may include one or more devices capable of sending/receiving voice and/or data to/from radio access network 120. Mobile terminal 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smartphone, a laptop computer (e.g., with a wireless air card), a global positioning system (GPS) device, a content recording device (e.g., a camera, a video camera, etc.), etc. In another example, mobile terminal 110 may include a fixed (e.g., provided in a particular location, such as within a user's business) computation and/or communication device, such as a machine-to-machine (M2M) client, a laptop computer, a personal computer, a tablet computer, a set-top box (STB), a television, a gaming system, etc.

Radio access network 120 may include one or more devices for transmitting voice and/or data to mobile terminals 110 and core network 150. In one example implementation, radio access network 120 may include a group of base stations 130 and a group of radio network controllers 140. In some instances, a component of radio access network 120 (e.g., base station 130 and radio network controller 130) may perform one or more functions described as being performed by another component or group of components in radio access network 120.

In one example, radio access network 120 may provide a wireless access network for mobile terminals 110. The wireless access network, in one implementation, may correspond to a Long Term Evolution (LTE) network. In another implementation, the wireless access network may include a WiFi network or other access networks (e.g., an enhanced high-rate packet data (eHRPD) network or a WiMax network). In still another implementation, the wireless access network may include a radio access network capable of supporting high data rate, low latency, packet optimization, large capacity and coverage, etc.

Base station 130 (also referred to as a "Node B") may include one or more devices that receive voice and/or data from radio network controller 140 and transmit that voice and/or data to mobile terminal 110 via an air interface. Base station 130 may also include one or more devices that receive voice and/or data from mobile terminal 110 over an air interface and transmit that voice and/or data to radio network controller 140 or other mobile terminals 110.

In one example implementation, base station 130 may store a backoff period definition to control a sequence of RCC connection requests from mobile terminal 110. Base station 130 may broadcast, via an overhead channel associated with the wireless access network, the backoff period definition. The backoff period definition may assign different backoff periods to different classes of mobile terminals 110. Base station 130 may receive, from mobile terminals 110, RCC connection requests sequenced by the different classes based on the backoff period definition.

Radio network controller 140 may include one or more devices that control and manage base station 130. Radio network controller 140 may also include devices that perform data processing to manage utilization of radio network services. Radio network controller 140 may transmit/receive voice and data to/from base station 130, other radio network controllers 140, and/or core network 150. Radio network controller 140 may act as a controlling radio network controller (CRNC), a drift radio network controller (DRNC), or a serving radio network controller (SRNC). A CRNC may be responsible for controlling the resources of a base station 130. On the other hand, a SRNC may serve a particular mobile terminal 110 and may manage connections towards that mobile terminal 110. Likewise, a DRNC may fulfill a similar role to the SRNC (e.g., may route traffic between a SRNC and a particular mobile terminal 110).

Core network 150 may include one or more devices that transfer/receive voice and/or data to a circuit-switched and/or packet-switched network. In one example implementation, core network 150 may include a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices.

Although FIG. 1 shows example components of network 100, in other implementations, network 100 may contain fewer components, different components, differently arranged components, or additional components than depicted in FIG. 1.

Figure 2:
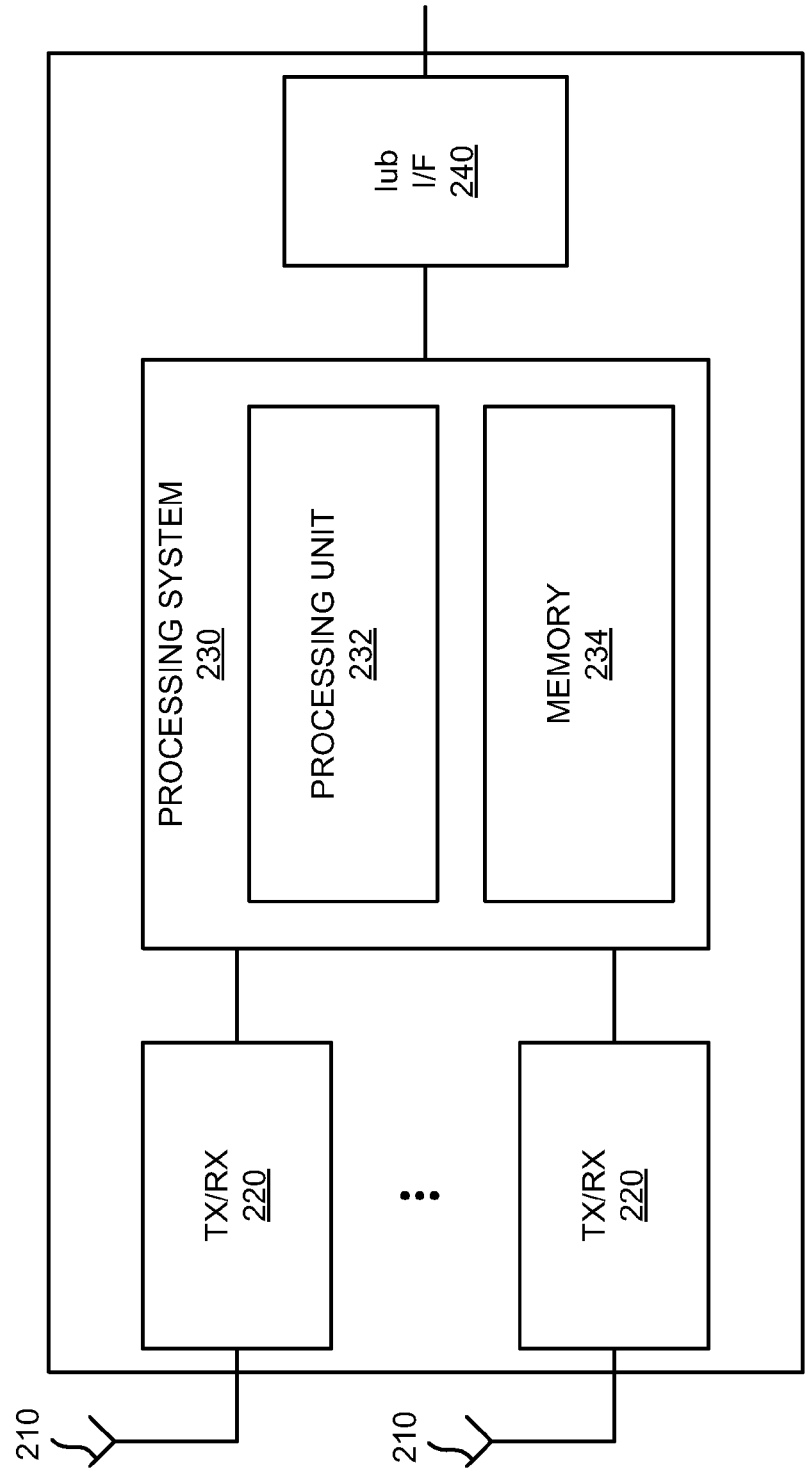
FIG. 2 is a diagram of example components of a base station of the network depicted in FIG. 1.

FIG. 2 is a diagram of example components of base station 130. As shown in FIG. 2, base station 130 may include antennas 210, transceivers (TX/RX) 220, a processing system 230, and an Iub interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 100, via antennas 210.

Processing system 230 may control the operation of base station 130. Processing system 230 may also process information received via transceivers 220 and Iub interface 240. Processing system 230 may further measure quality and strength of a connection, may determine a frame error rate (FER), and may transmit this information to radio network controller 140. As illustrated, processing system 230 may include a processing unit 232 and a memory 234.

Processing unit 232 may include one or more processors, microprocessors, application specific integrated circuits (ASICs), field programmable gate arrays (FPGAs), or the like. Processing unit 232 may process information received via transceivers 220 and Iub interface 240. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may transmit control messages and/or data messages, and may cause those control messages and/or data messages to be transmitted via transceivers 220 and/or Iub interface 240. Processing unit 232 may also process control messages and/or data messages received from transceivers 220 and/or Iub interface 240.

Memory 234 may include a random access memory (RAM), a read-only memory (ROM), and/or another type of memory to store data and instructions that may be used by processing unit 232.

Iub interface 240 may include one or more line cards that allow base station 130 to transmit data to and receive data from radio network controller 140.

As described herein, base station 130 may perform certain operations in response to processing unit 232 executing software instructions contained in a computer-readable medium, such as memory 234. A computer-readable medium may be defined as a non-transitory memory device. A memory device may include space within a single physical memory device or spread across multiple physical memory devices. The software instructions may be read into memory 234 from another computer-readable medium or from another device via antennas 210 and transceivers 220. The software instructions contained in memory 234 may cause processing unit 232 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of base station 130, in other implementations, base station 130 may contain fewer components, different components, differently arranged components, or additional components than depicted in FIG. 2. Alternatively, or additionally, one or more components of base station 130 may perform one or more other tasks described as being performed by one or more other components of base station 130.

Figure 3:
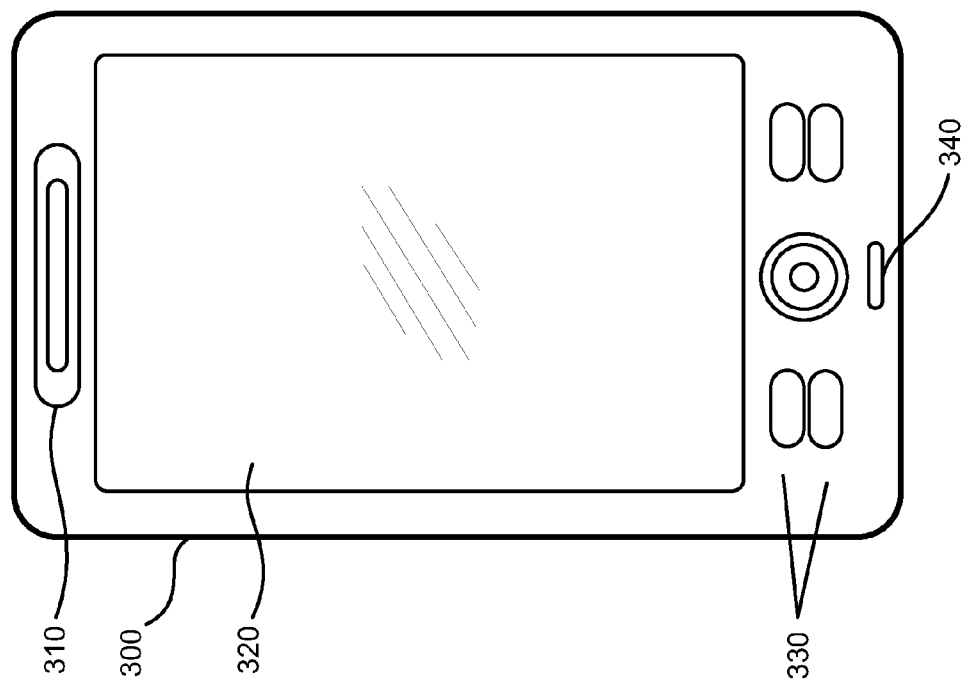
FIG. 3 is a diagram of an example mobile terminal of the network illustrated in FIG. 1.

FIG. 3 is a diagram of an example mobile terminal 110 (e.g., a mobile communication device). As illustrated, mobile terminal 110 may include a housing 300, a speaker 310, a display 320, control buttons 330, and a microphone 340. Housing 300 may protect the components of mobile terminal 110 from outside elements. Speaker 310 may provide audible information to a user of mobile terminal 110.

Display 320 may provide visual information to the user. For example, display 320 may display text input into mobile terminal 110; text, images, video, and/or graphics received from another device; and/or information regarding incoming or outgoing calls or text messages, emails, media, games, phone books, address books, the current time, etc. In one example implementation, display 320 may include a touch screen display that may be configured to receive a user input when the user touches display 320.

Control buttons 330 may permit the user to interact with mobile terminal 110 to cause mobile terminal 110 to perform one or more operations. For example, control buttons 330 may be used to cause mobile terminal 110 to transmit information. In one example implementation, control buttons 330 may be omitted, and the functionality provided by control buttons 330 may be provided by display 320 (e.g., via a touch screen display). Microphone 340 may receive audible information from the user.

Although FIG. 3 shows example components of mobile terminal 110, in other implementations, mobile terminal 110 may contain fewer components, different components, differently arranged components, or additional components than depicted in FIG. 3. Alternatively, or additionally, one or more components of mobile terminal 110 may perform one or more other tasks described as being performed by one or more other components of mobile terminal 110.

Figure 4:
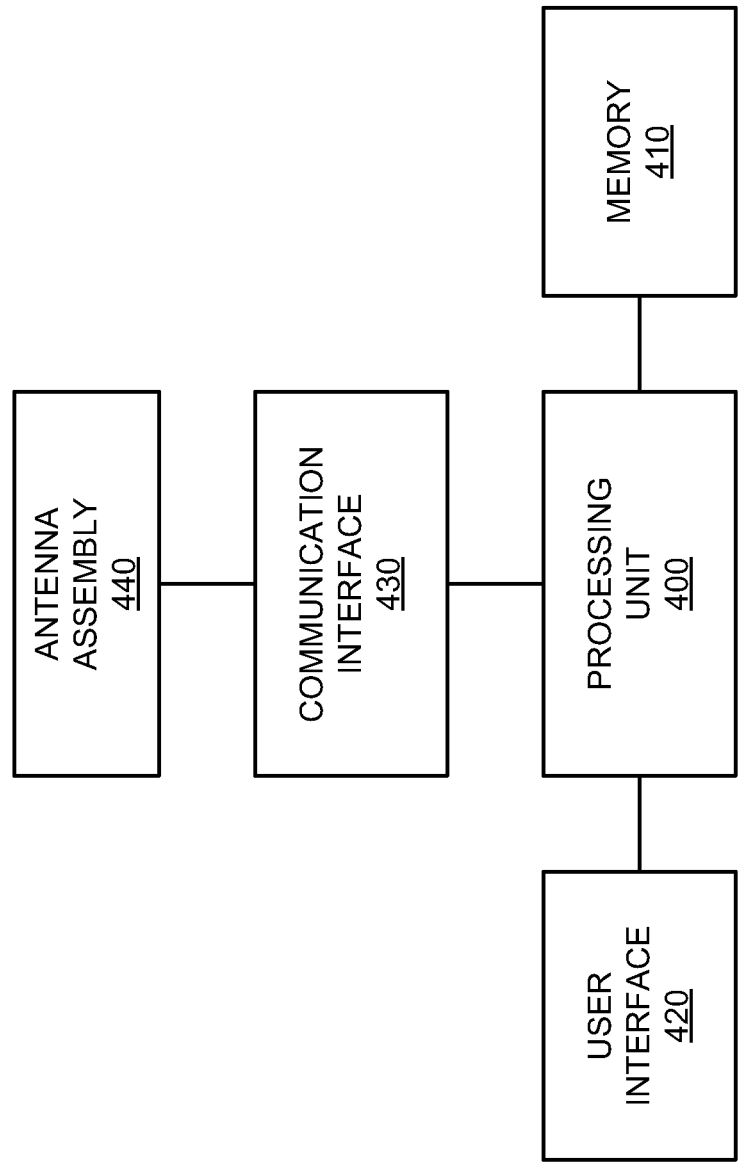
FIG. 4 is a diagram of example components of the mobile terminal depicted in FIG. 3.

FIG. 4 is a diagram of example components of mobile terminal 110. As shown, mobile terminal 110 may include a processing unit 400, memory 410, a user interface 420, a communication interface 430, and an antenna assembly 440. Components of mobile terminal 110 may interconnect via wired and/or wireless connections.

Processing unit 400 may include one or more processors, microprocessors, ASICs, FPGAs, or the like. Processing unit 400 may control operation of mobile terminal 110 and its components in a manner described herein.

Memory 410 may include a RAM, a ROM, and/or another type of memory to store data and instructions that may be used by processing unit 400.

User interface 420 may include mechanisms for inputting information to mobile terminal 110 and/or for outputting information from mobile terminal 110. Examples of input and output mechanisms might include buttons (e.g., control buttons 330, a joystick, etc.) or a touch screen interface to permit data and control commands to be input into mobile terminal 110; a speaker (e.g., speaker 310) to receive electrical signals and output audio signals; a microphone (e.g., microphone 340) to receive audio signals and output electrical signals; a display (e.g., display 320) to output visual information (e.g., text input into mobile terminal 110); and/or a vibrator to cause mobile terminal 110 to vibrate.

Communication interface 430 may include, for example, a transmitter that may convert baseband signals from processing unit 400 to RF signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network.

As described herein, mobile terminal 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows example components of mobile terminal 110, in other implementations, mobile terminal 110 may contain fewer components, different components, differently arranged components, or additional components than depicted in FIG. 4. Alternatively, or additionally, one or more components of mobile terminal 110 may perform one or more other tasks described as being performed by one or more other components of mobile terminal 110.

Figure 5:
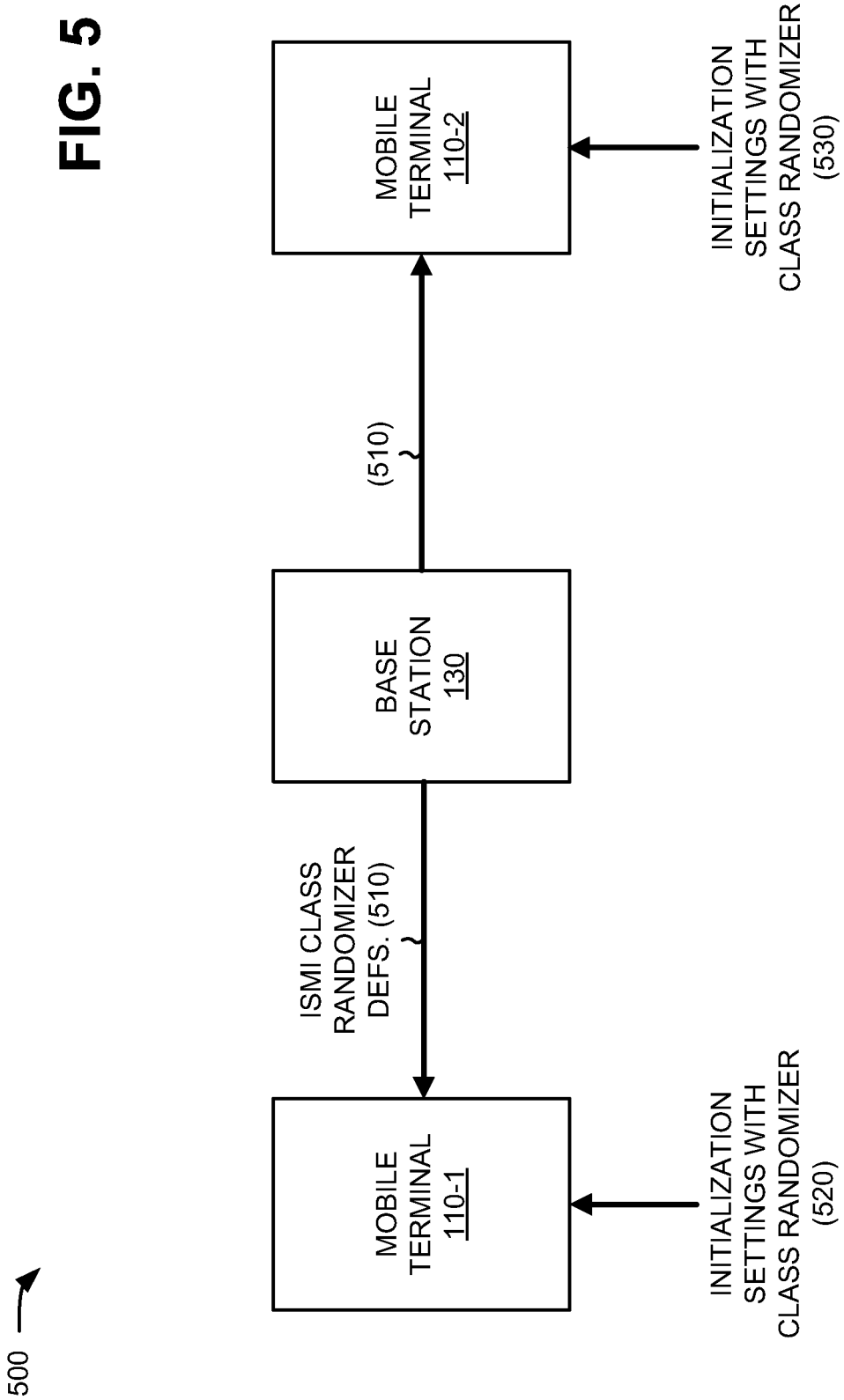
FIG. 5 is a diagram of example operations capable of being performed by an example portion of the network illustrated in FIG. 1.

FIG. 5 is a diagram of example operations capable of being performed by an example portion 500 of network 100. As shown, example network portion 500 may include mobile terminals 110-1 and 110-2 and base station 130. Mobile terminals 110-1 and base station 130 may include the features described above in connection with, for example, one or more of FIGS. 1-4.

As shown in FIG. 5, base station 130 may broadcast International Mobile Subscriber Identity (IMSI) class randomizer definitions 510 to mobile terminals 110-1 and 110-2. In one implementation, IMSI class randomizer definitions 510 may be provided via a common control channel (CCCH). IMSI class randomizer definitions 510 may define, for example, segments of numeric values associated with the IMSI. For example, IMSI class definition 510 may provide groupings based on the last hexadecimal digit of the IMSI. Thus, class randomizer definitions 510 may define up to sixteen groupings (e.g., using the hexadecimal symbols 0-9 and A-F). In other implementations, class randomizer definitions 510 may combine groups of hexadecimal symbols to define fewer than sixteen groupings. The IMSI typically ends with a Mobile Station Identification Number (MSIN) that is directly administered by a network operator. Thus, depending on how the MSIN is assigned, IMSI class randomizer definitions 510 may include a random subset of mobile terminals 110 or a particular type of mobile terminals 110 (e.g., if the last hexadecimal value of the MSIN is assigned based on a particular type of mobile terminal 110). Depending on the IMSI assigned to each mobile terminal 110, mobile terminal 110-1 may be assigned to one class and mobile terminal 110-2 may be assigned to a different class based on the same set of broadcast of IMSI class randomizer definitions 510. IMSI class randomizer definitions 510 may be received by each mobile terminal 110 and stored, for example, in a memory (e.g., memory 410) of mobile terminal 110.

Alternatively, or additionally, mobile terminal 110-1 may receive initialization settings 520 with a class randomizer, and mobile terminal 110-2 may receive initialization settings 530 with a class randomizer. Initialization settings 520/530 may be provided to mobile terminals 110 when wireless network services are initially set up for mobile terminals 110. Thus, initialization settings 520/530 may be provided via base station 130 or may be manually configured by a user/technician. Initialization settings 520/530 may include, for example, a class definition for each mobile terminal 110. Class definitions may be assigned to mobile terminals 110, for example, based on the type of device and/or the type of use intended for the device. For example, different classes may be assigned based on whether a particular mobile terminal 110 is a M2M terminal, a game console, an alarm device, a regular handset (e.g., such as a smart phone, a PDA), etc. Additionally, classes may be defined based on primary uses or service plans, such as for first responders, premium service plans, regular services, etc. Thus, the initialization settings 520 with a class randomizer for mobile terminal 110-1 may be different than the initialization settings 530 with a class randomizer for mobile terminal 110-2. Initialization settings 520/530 may be received by each mobile terminal 110 and stored, for example, in a memory (e.g., memory 410) of mobile terminal 110. In another implementation, initialization settings 520/530 may detect a class identifier that may be pre-installed on mobile terminal 110 (e.g., by a vendor or an original equipment manufacturer (OEM)), based on the type of manufactured device.

Although FIG. 5 shows example components of network portion 500, in other implementations, network portion 500 may contain fewer components, different components, differently arranged components, or additional components than depicted in FIG. 5. Alternatively, or additionally, one or more components of network portion 500 may perform one or more other tasks described as being performed by one or more other components of network portion 500.

Figure 6:
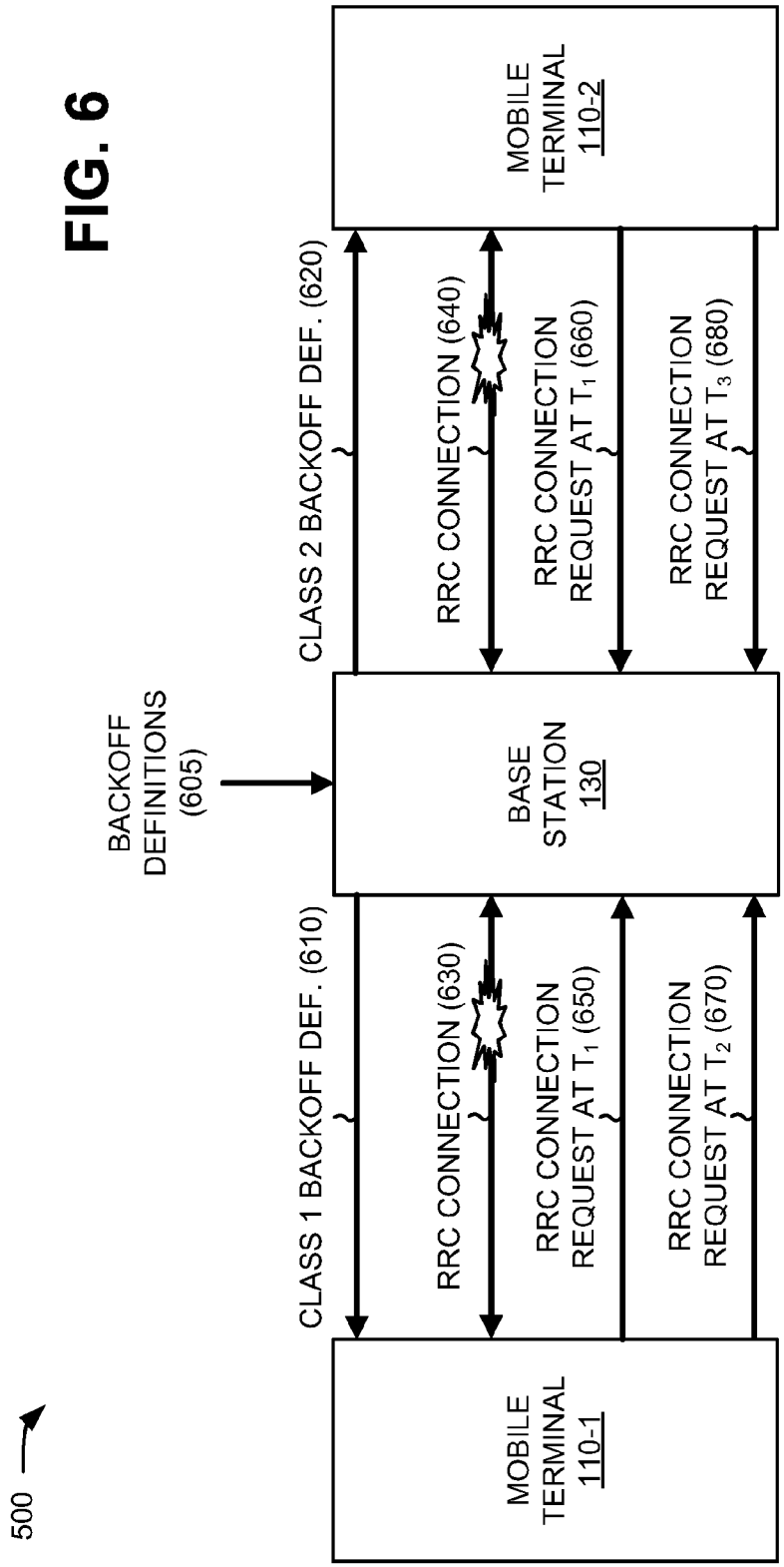
FIG. 6 is another diagram of example operations capable of being performed by the example portion of the network illustrated in FIG. 5.

FIG. 6 is a diagram of other example operations capable of being performed by the example network portion 500. As shown, example network portion 500 may include mobile terminals 110-1 and 110-2 and base station 130. Mobile terminals 110-1 and base station 130 may include the features described above in connection with, for example, one or more of FIGS. 1-5.

As shown in FIG. 6, base station 130 may receive a set of backoff definitions 605. Backoff definitions 605 may include for example, one or more equations to instruct mobile terminal 110 how to calculate a backoff (e.g., delay) period for sending a re-access request to base station 130. In one implementation, backoff definitions 605 may be dynamically adjusted based on network conditions. For example, under normal network conditions, backoff definitions 605 may include the same backoff period for every assigned class. However, when network conditions would result in large volume of simultaneous access requests (such as a power outage that may affect numerous mobile terminals within a cell of base station 130), backoff definitions 605 may be changed to stagger re-access requests based on the class randomizers assigned to mobile terminals 110. In one implementation, backoff definitions may be provided to base station 130 from a network operation center (NOC) associated with core network 150. In other implementations, multiple backoff definitions 605 may be stored at base station 130 and activated (e.g., by base station 130) based on particular network conditions (e.g., when base station 130 has a particular number of concurrently connected devices).

Base station 130 may provide class 1 backoff definition 610 to mobile terminal 110-1 and class 2 backoff definition 620 to mobile terminal 110-2. Class 1 backoff definition 610 may include a backoff period for a class randomizer assigned to mobile terminal 110-1 (e.g., by class definitions 510 and/or initialization settings 520). Class 2 backoff definition 620 may include a backoff period for a class randomizer assigned to mobile terminal 110-2 (e.g., by class definitions 510 and/or initialization settings 530).

In one implementation, class 1 backoff definition 610 and class 2 backoff definition 620 may be included as part of a single broadcast message (e.g., sent over a CCCH). For example, the single broadcast message may include a calculation with a variable (e.g., a class randomizer variable) that may be applied differently by mobile terminals 110-1 and 110-2 based on the class randomizer assigned to each of the mobile terminals 110. That is, the message to each of mobile terminals 110 may be the same, but the re-access (e.g., backoff) period may be dependent upon the class (type) of device that is re-accessing the RAN 120. In another implementation, class 1 backoff definition 610 and class 2 backoff definition 620 may be customizable definitions/equations that can be downloaded by each of mobile terminals 110 (e.g., using Open Mobile Alliance—Device Management (OMA-DM) communication protocols) based on the assigned class of the mobile terminals.

Still referring to FIG. 6, a RRC connection 630 between mobile terminal 110-1 and base station 130 may be terminated, and a RRC connection 640 between mobile terminal 110-2 and base station 130 may be terminated. RRC connection 630 and RRC connection 640 may be terminated, for example, at the same time (e.g., due to a problem with base station 130) or at different times. Assume, at some time after RRC connection 630 and RRC connection 640 are terminated, mobile terminals 110 may simultaneously attempt to reconnect to RAN 120.

As further shown in FIG. 6, mobile terminal 110-1 may generate a RRC connection request 650, and may provide RRC connection request 650, at time $T_1$, to base station 130. RRC connection request 650 may include a RRC establishment cause and an initial terminal identifier (e.g., of mobile terminal 110-1). The initial terminal identifier may be an identifier that is unique to mobile terminal 110-1 and may permit identification of mobile terminal 110-1 despite its location. In one example, mobile terminal 110-1 may provide RRC connection request 650 to base station 130 on a common control channel (CCCH). Upon transmitting RRC connection request 650, mobile terminal 110-1 may trigger an internal timer and may wait for a RRC connection setup message (e.g., from base station 130) on the CCCH. If the RRC connection setup message is not received within the period defined by the timer, mobile terminal 110-1 may wait for a particular time (e.g., a backoff period) before sending another connection request. The backoff period used by mobile terminal 110-1 may be defined by class 1 backoff definition 610. After the backoff period defined by class 1 backoff definition 610 is compete, mobile terminal 110-1 may send another RRC connection request 670, at time $T_2$.

Similarly, mobile terminal 110-2 may generate a RRC connection request 660, and may provide RRC connection request 660, at time $T_1$, to base station 130. RRC connection request 660 may include a RRC establishment cause and an initial terminal identifier (e.g., of mobile terminal 110-2). The initial terminal identifier may be an identifier that is unique to mobile terminal 110-2 and may permit identification of mobile terminal 110-2 despite its location. Mobile terminal 110-2 may provide RRC connection request 660 to base station 130 on the CCCH. Upon transmitting RRC connection request 660, mobile terminal 110-2 may trigger an internal timer and may wait for a RRC connection setup message (e.g., from base station 130) on the on the CCCH. If the RRC connection setup message is not received within the period defined by the timer, mobile terminal 110-1 may wait for a different particular time (e.g., a different backoff period) before sending another connection request. The backoff period used by mobile terminal 110-2 may be defined by class 2 backoff definition 620. After the backoff period defined by class 2 backoff definition 620 is compete, mobile terminal 110-2 may send another RRC connection request 680, at time $T_3$.

Although FIG. 6 shows example components of network portion 500, in other implementations, network portion 500 may contain fewer components, different components, differently arranged components, or additional components than depicted in FIG. 6. Alternatively, or additionally, one or more components of network portion 500 may perform one or more other tasks described as being performed by one or more other components of network portion 500.

Figure 7:
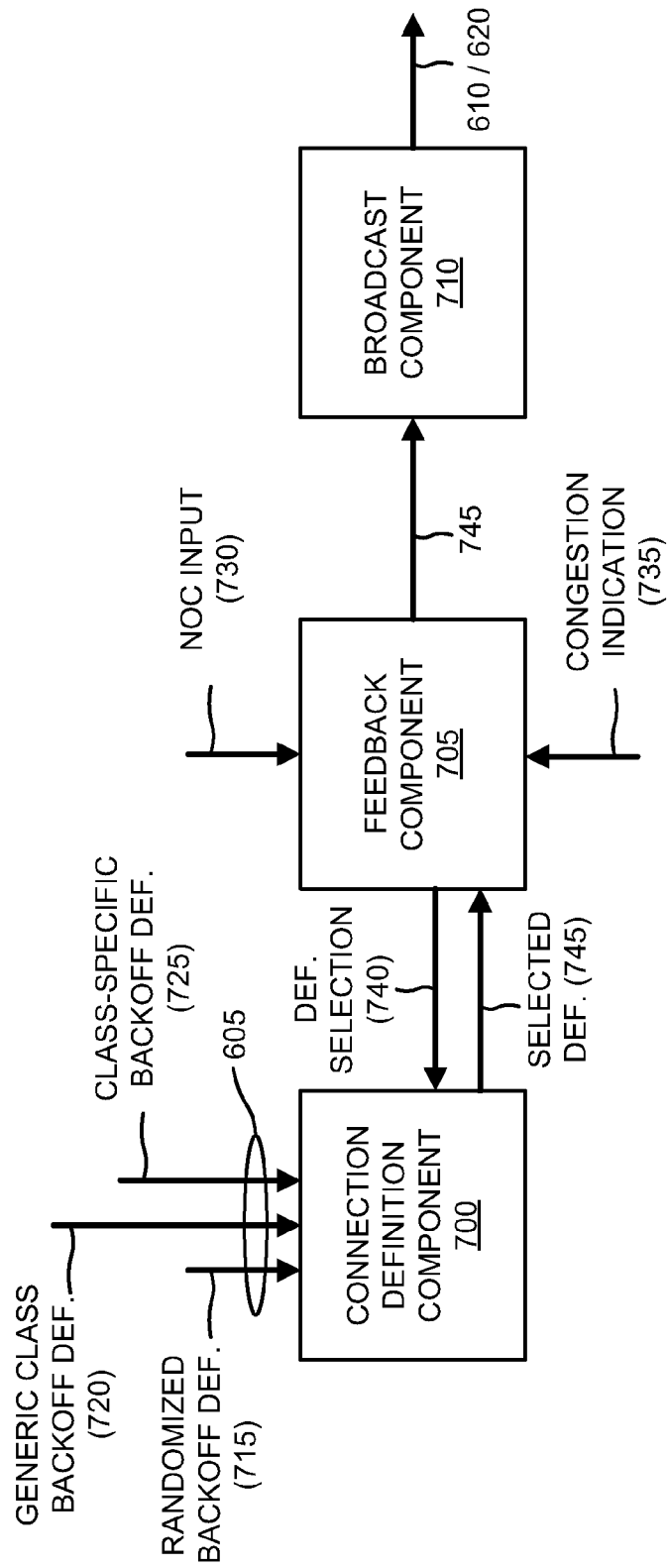
FIG. 7 is a diagram of example functional components of the base station of FIG. 1.

FIG. 7 is a diagram of example functional components of base station 130. In one implementation, the functions described in connection with FIG. 7 may be performed by one or more components of base station 130 (FIG. 2). As illustrated in FIG. 7, base station 130 may include a connection definition component 700, a feedback component 705, and a broadcast component 710.

Connection definition component 700 may include hardware or a combination of hardware and software that may receive and store backoff definitions 605. Backoff definitions 605 may include, for example, one or more of a randomized backoff definition 715, a generic class backoff definition 720, or a class-specific backoff definition 725. Backoff definitions 605 may be stored, for example, in a memory of base station 130 (e.g., memory 234).

Randomized backoff definition 715 may include a calculation to stagger re-access requests from mobile terminals 110 based on, for example, a portion of an IMSI number. For example, randomized backoff definition 715 may include a different initial backoff period for each last hexadecimal digit in an IMSI. If an initial re-access request is not successful, subsequent re-access requests from mobile terminal 110 may be performed at a default interval to maintain a staggered requested interval among multiple mobile devices. The backoff definition may be expressed, for example, by the following logic:

If {IMSI hex. value}=0, Backoff=x;
If {IMSI hex. value}=1, Backoff=(x+10 ms), then x;
If {IMSI hex. value}=2, Backoff=(x+20 ms), then x; etc., where x is greater than 10 ms.

Generic class backoff definition 720 may include a single backoff definition to which mobile terminal 110 may apply a different variable based on the class randomizer assigned to mobile terminal 110. For example, generic class backoff definition 720 may be expressed as a function of x, where x is an assigned class randomizer (e.g., for mobile terminal 110). Mobile terminal 110 may receive generic class backoff definition 720 and may apply the appropriate class randomizer value for mobile terminal 110. For example, if mobile terminal 110-1 has a class randomizer value of 1 (e.g., from initialization settings 520), mobile terminal 110-1 may apply a value of 1 to generic class backoff definition 720. Conversely, if mobile terminal 110-2 has a class randomizer value of 2 (e.g., from initialization settings 530), mobile terminal 110-2 may apply a value of 2 to generic class backoff definition 720.

Class-specific backoff definitions 725 may include multiple backoff definitions, where each backoff definition corresponds to a different randomizer class. For example, a different class-specific backoff definition 725 may be available for each randomizer class (e.g., based on whether a particular mobile terminal 110 is a M2M terminal, a game console, an alarm device, a regular handset, etc.). In one implementation, class-specific backoff definitions 725 may be provided using OMA-DM protocols. Connection definition component 700 may receive class-specific backoff definitions 725 when mobile terminal 110 become live. Connection definition component 700 may, based on the assigned class of mobile terminal 110, load the appropriate class-specific backoff definition 725 from an overhead channel message. Mobile terminal 110-1, for example, may load class specific backoff definition 725 for a class randomizer value of 1 (e.g., based on the class randomizer value assigned by initialization settings 520). Conversely, mobile terminal 110-2 may load class specific backoff definition 725 for a class randomizer value of 2 (e.g., based on the class randomizer value assigned by initialization settings 530).

Feedback component 705 may include hardware or a combination of hardware and software to select one of backoff definitions 605 (e.g., one or more of randomized backoff definition 715, generic class backoff definition 720, or class-specific backoff definitions 725) from connection definition component 700. For example, feedback component 705 may receive a network operation center (NOC) input 730 based on network conditions and/or instructions from a network administrator. NOC input 730 may include, for example, instructions to retrieve/apply randomized backoff definition 715, generic class backoff definition 720, or class-specific backoff definitions 725. Alternatively, or additionally, feedback component 705 may receive a congestion indication 735. Congestion indication 735 may include a reading from a resource monitor that bandwidth capacity for base station 130 has reached a high level threshold. Based on NOC input 730 and/or congestion indication 735, feedback component 705 may provide a definition selection 740 (e.g., identifying randomized backoff definition 715, generic class backoff definition 720, or class-specific backoff definitions 725) to connection definition component 700. Based on the identified backoff definition in definition selection 740, connection definition component 700 may retrieve the identified backoff definition (e.g., from memory 234) and may provide selected definition 745 to feedback component 705.

Broadcast component 710 may include hardware or a combination of hardware and software to provide selected backoff definitions to mobile terminals 110. For example, broadcast component 710 may receive selected definition 745 from feedback component 705 and may broadcast selected definition 745 to mobile terminals 110. In one implementation, selected definition 745 may be broadcast to mobile terminals 110 using an overhead message channel for RAN 120. In one implementation, selected definition 745 may correspond to class 1 backoff definition 610 and/or class 2 backoff definition 620. Backoff definitions 610/620 may be implemented by mobile terminals 110 to provide autonomous network access congestion and collision control.

Although FIG. 7 shows example functional components of base station 130, in other implementations, base station 130 may contain fewer functional components, different functional components, differently arranged functional components, or additional functional components than depicted in FIG. 7. Additionally, or alternatively, one or more functional components of base station 130 may perform one or more other tasks described as being performed by one or more other functional components of base station 130.

Figure 8:
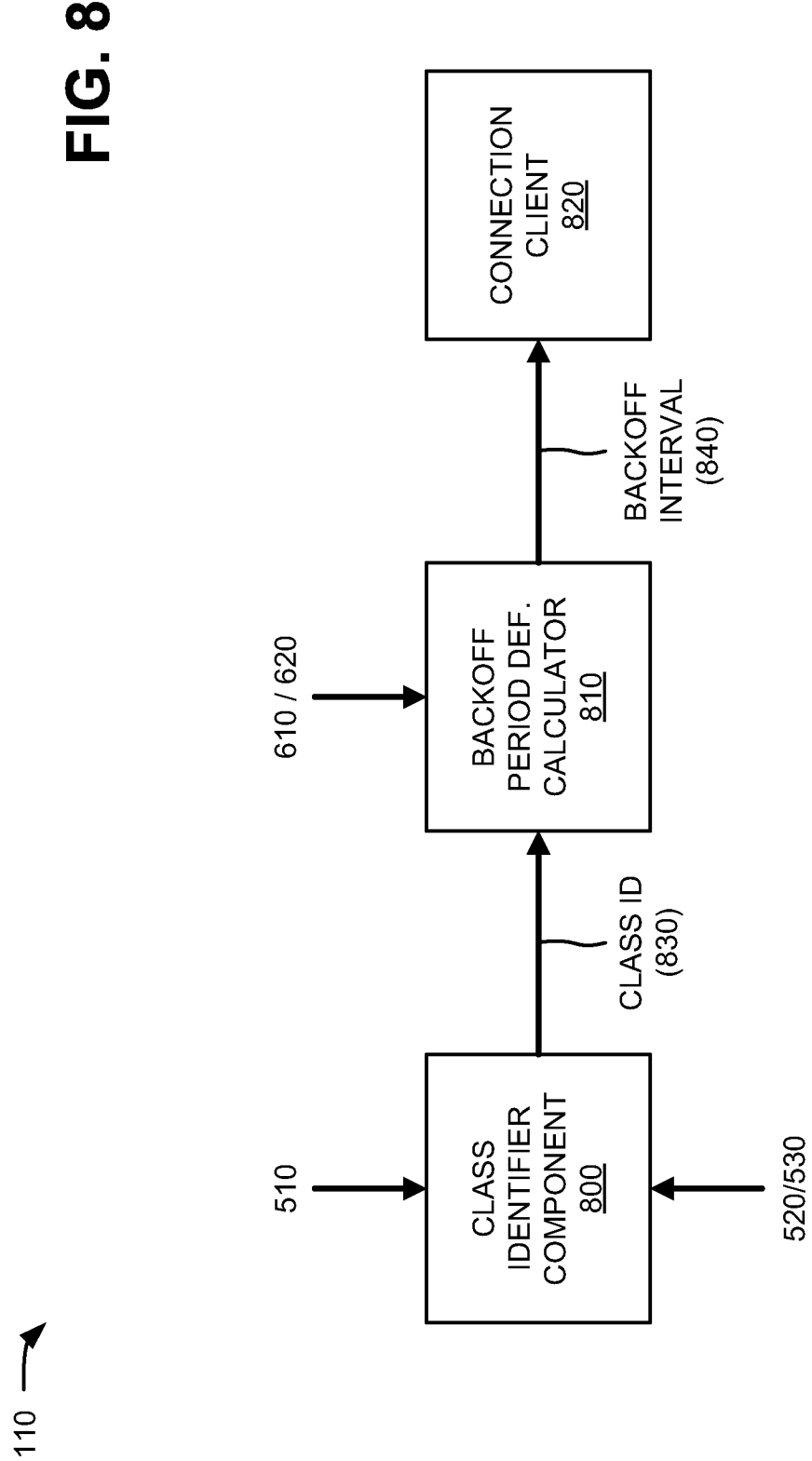
FIG. 8 is a diagram of example functional components of one of the mobile terminals of FIG. 1.

FIG. 8 is a diagram of example functional components of mobile terminal 110. In one implementation, the functions described in connection with FIG. 8 may be performed by one or more components of mobile terminal 110 (FIG. 4). As illustrated in FIG. 8, mobile terminal 110 may include a class identifier component 800, a backoff period definition calculator 810, and a connection client 820.

Class identifier component 800 may include hardware or a combination of hardware and software to determine a class randomizer value for mobile terminal 110. For example, class identifier component 800 may receive IMSI class randomizer definitions 510 and determine, based on an IMSI associated with mobile terminal 110, a class randomizer value for mobile terminal 110. Alternatively, or additionally, class identifier component 800 may retrieve a class randomizer value from initialization settings 520/530. Class identifier component 800 may provide the determined class randomizer value to backoff period definition calculator 810 as class identifier (ID) 830.

Backoff period definition calculator 810 may include hardware or a combination of hardware and software to calculate a backoff period for mobile terminal 110. For example, backoff period definition calculator 810 may receive class 1 backoff definition 610 and/or class 2 backoff definition 620 from base station 130. Backoff period definition calculator 810 may also receive class identifier 830 from class identifier component 800. If necessary, backoff period definition calculator 810 may select an appropriate backoff definition being broadcast from base station 130 (e.g., broadcast on an overhead channel of RAN 120). For example, backoff period definition calculator 810 may select a class definition that corresponds to one of class 1 backoff definition 610 and/or class 2 backoff definition 620. Backoff period definition calculator 810 may apply class identifier 830 to the selected class definition to determine a backoff interval 840. Backoff period definition calculator 810 may send backoff interval 840 to connection client 820.

Connection client 820 may include hardware or a combination of hardware and software to manage re-access request intervals for mobile terminal 110. For example, connection client 820 may receive backoff interval 840 and may send RRC connection requests to base station 130 based on backoff interval 840.

Although FIG. 8 shows example functional components of mobile terminal 110, in other implementations, mobile terminal 110 may contain fewer functional components, different functional components, differently arranged functional components, or additional functional components than depicted in FIG. 8. Additionally, or alternatively, one or more functional components of mobile terminal 110 may perform one or more other tasks described as being performed by one or more other functional components of mobile terminal 110.

Figure 9:
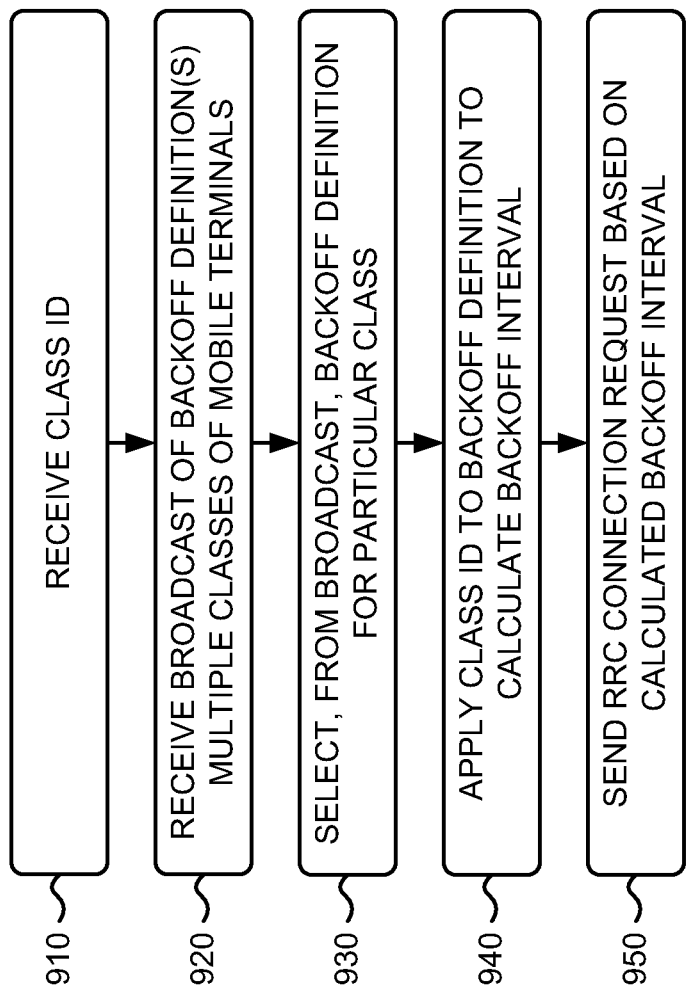
FIGS. 9 and 10 are flow charts of an example process for performing autonomous network access congestion control according to implementations described herein.
Figure 10:
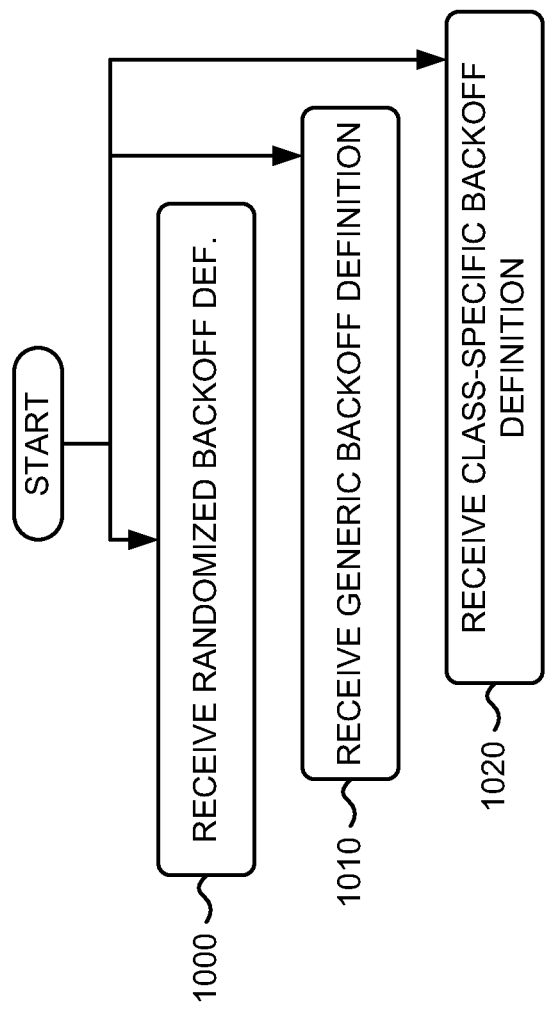

FIGS. 9 and 10 are flow charts of an example process 900 for performing autonomous network access congestion control according to implementations described herein. In one implementation, process 900 may be performed by mobile terminal 110. In another implementation, some or all of process 900 may be performed by another device or group of devices (e.g., base station 130), including or excluding base mobile terminal 110.

As shown in FIG. 9, process 900 may include receiving a class identifier (block 910). For example, in implementations described above in connection with FIG. 5, base station 130 may broadcast IMSI class randomizer definitions 510 to mobile terminals 110-1 and 110-2. In one implementation, IMSI class randomizer definitions 510 may be provided via a CCCH. IMSI class randomizer definitions 510 may define, for example, segments of numeric values associated with the IMSI. For example, IMSI class definition 510 may provide groupings based on the last hexadecimal digit of the IMSI. Alternatively, or additionally, base station 130 may provide initialization settings 520 with a class randomizer to mobile terminal 110-1 and initialization settings 530 with a class randomizer to mobile terminal 110-2. Initialization settings 520/530 may be provided to mobile terminals 110 when wireless network services are initially set up for mobile terminals 110. In another implementation, initialization settings 520/530 may detect a class identifier that may be pre-installed on mobile terminal 110 (e.g., by a vendor or an OEM), based on the type of manufactured device.

Referring again to FIG. 9, process 900 may include receiving a broadcast of one or more backoff definitions for multiple classes of mobile terminals (block 920). For example, in implementations described above in connection with FIG. 6, a set of backoff definitions 605 may include for example, one or more equations to instruct mobile terminal 110 how to calculate a backoff (e.g., delay) period for sending a re-access request to base station 130. Base station 130 may provide class 1 backoff definition 610 to mobile terminal 110-1 and class 2 backoff definition 620 to mobile terminal 110-2. Class 1 backoff definition 610 may include a backoff period for a class randomizer assigned to mobile terminal 110-1 (e.g., by class definitions 510 and/or initialization settings 520). Class 2 backoff definition 620 may include a backoff period for a class randomizer assigned to mobile terminal 110-2 (e.g., by class definitions 510 and/or initialization settings 530). In one implementation, class 1 backoff definition 610 and class 2 backoff definition 620 may be included as part of a single broadcast message (e.g., sent over an overhead channel, such as a CCCH).

As further shown in FIG. 9, process 900 may include selecting, from the broadcast, a backoff definition for a particular class (block 930) and applying the class identifier to the backoff definition (block 940). For example, in implementations described above in connection with FIG. 8, backoff period definition calculator 810 may receive class 1 backoff definition 610 and/or class 2 backoff definition 620 from base station 130. Backoff period definition calculator 810 may also receive class identifier 830 from class identifier component 800. If necessary, backoff period definition calculator 810 may select an appropriate backoff definition being broadcast from base station 130 (e.g., broadcast on an overhead channel of RAN 120). For example, backoff period definition calculator 810 may select a class definition that corresponds to one of class 1 backoff definition 610 and/or class 2 backoff definition 620. Backoff period definition calculator 810 may apply class identifier 830 to the selected class definition to determine a backoff interval 840.

Returning to FIG. 9, process 900 may include sending an RRC connection request based on the calculated backoff interval (block 950). For example, in implementations described above in connection with FIG. 8, backoff period definition calculator 810 may send backoff interval 840 to connection client 820. Connection client 820 may receive backoff interval 840 and may send RRC connection requests to base station 130 based on backoff interval 840.

Process block 920 may include the process blocks depicted in FIG. 10. As shown in FIG. 10, process block 910 may include receiving a randomized backoff definition (block 1000), receiving a generic backup definition (block 1010), or receiving a class-specific backoff definition (block 1020). For example, mobile terminal 110 may receive backoff definitions 605 from base station 130. In implementations described above in connection with FIG. 7, backoff definitions 605 may include, for example, one or more of randomized backoff definition 715, generic class backoff definition 720, or class-specific backoff definitions 725. Randomized backoff definition 715 may include a calculation to stagger re-access requests from mobile terminals 110 based on, for example, a portion of an IMSI number. For example randomized backoff definition 715 may include a different initial backoff period for each last hexadecimal digit in an IMSI. Generic class backoff definition 720 may include a single backoff definition to which mobile terminal may apply a different variable based on the class randomizer assigned to the mobile terminal. For example, the generic class backoff definition 720 may be expressed as a function of x, where x is an assigned class randomizer (e.g., for mobile terminal 110). Mobile terminal 110 may receive generic equation 720 and may apply the appropriate class randomizer value for mobile terminal 110. Class-specific backoff definitions 725 may include multiple backoff definitions, where each backoff definition corresponds to a different randomizer class. For example, a different class-specific backoff definition 725 may be available for each randomizer class (e.g., based on whether a particular mobile terminal 110 is a M2M terminal, a game console, an alarm device, a regular handset, etc.).

Figure 11:
FIG. 11 is a flow chart of another example process for performing autonomous network access congestion control according to implementations described herein.

FIG. 11 is a flow chart of another example process 1100 for performing autonomous network access congestion control according to implementations described herein. In one implementation, process 1100 may be performed by base station 130. In another implementation, some or all of process 1100 may be performed by another device or group of devices, including or excluding base station 130.

As shown in FIG. 11, process 1100 may include providing class identifiers to mobile terminals (block 1110). For example, in implementations described above in connection with FIG. 5, base station 130 may broadcast IMSI class randomizer definitions 510 to mobile terminals 110-1 and 110-2. IMSI class definition 510 may provide groupings based on the last hexadecimal digit of the IMSI.

Process 1100 may include receiving one or more backoff definitions (block 1120), and selecting a backoff definition to control connection requests from mobile terminals (block 1130). For example, in implementations described above in connection with FIG. 7, base station 130 (e.g., connection definition component 700) may receive and store backoff definitions 605. Backoff definitions 605 may include, for example, one or more of randomized backoff definition 715, generic class backoff definition 720, or class-specific backoff definitions 725. Backoff definitions 605 may be stored, for example, in a memory of base station 130 (e.g., memory 234). Based on NOC input 730 and/or congestion indication 735, feedback component 705 may provide definition selection 740 (e.g., identifying randomized backoff definition 715, generic class backoff definition 720, or class-specific backoff definitions 725) to connection definition component 700.

Process 1100 may include broadcasting, to the mobile terminals, the backoff definition with a class variable (block 1140), and receiving connection requests from the mobile terminals based on the backoff definition and the class identifiers (block 1150). For example, in implementations described above in connection with FIG. 7, broadcast component 710 may provide selected backoff definitions to mobile terminals 110. For example, broadcast component 710 may receive selected definition 745 from feedback component 705 and may broadcast selected definition 745 to mobile terminals 110. In one implementation, selected definition 745 may be broadcast to mobile terminals 110 using an overhead message channel for RAN 110. In one implementation, selected definition 745 may correspond to class 1 backoff definition 610 and/or class 2 backoff definition 620. Backoff definitions 610/620 may be implemented by mobile terminals 110 to provide autonomous network access congestion and collision control.

Systems and/or methods described herein may define classes for mobile terminals to manage network access congestion and/or collisions. The classes may be based on, for example, particular types of mobile terminals or particular primary functions of the mobile terminals. In other implementations, the classes may be randomly assigned base on a mobile terminal identifier, such as an IMSI of the mobile terminal. The systems and/or methods may assign different backoff periods to different classes of mobile terminals such that congestion during a mass network access event (e.g., due to a power failure, system outage, natural disaster, etc.) may be mitigated. In one implementation, shorter backoff periods may be assigned to high priority mobile terminal and longer backoff periods may be assigned to lower priority mobile terminals so that connection requests can be managed accordingly.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-11, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a base station in a wireless access network, the method comprising:
receiving, by the base station and from a network operation center (NOC), multiple backoff period definitions for sending a re-access request to the base station by multiple classes of mobile terminals associated with the wireless access network, wherein the multiple classes are distinguished based on a last hexadecimal value of a Mobile Station Identification Number (MSIN) assigned to the mobile terminal;
storing, in a memory associated with the base station, the multiple backoff period definitions;
selecting, by the base station and based on a particular network condition, one of the multiple backoff period definitions to control a sequence of radio resource control (RCC) re-access requests from the multiple classes;
sending over a broadcast channel, by the base station and to mobile terminals within a signal range of the base station, the selected one of the multiple backoff period definitions, wherein the selected one of the multiple backoff period definitions includes a class randomizer variable and wherein the one of the one or more backoff period definitions is applied differently by different mobile terminals based on application of the MSIN to the class randomizer variable; and
receiving, by the base station and from the mobile terminals, RCC re-access requests sequenced by the multiple classes based on the selected one of the multiple backoff period definitions.

2. The method of claim 1, further comprising:
  changing one of the multiple backoff period definitions, where the changing is based on:
  instructions from the NOC associated with the base station, or
  determining whether a threshold number of mobile terminals are connected to the base station.

3. The method of claim 1, where sending the one of the multiple backoff period definitions includes:
  broadcasting the one of the multiple backoff period definitions via an overhead channel message of the wireless access network.

4. The method of claim 1, wherein the Mobile Station Identification Number (MSIN) is based on a type of the mobile terminals.

5. The method of claim 4, wherein the type of the mobile terminals includes:
  a machine-to-machine (M2M) terminal,
  a game console,
  an alarm device, or
  a mobile handset.

6. The method of claim 1, wherein each of the backoff periods definition includes a generic equation that includes a class-dependent variable that is applied by the mobile terminals.

7. The method of claim 1, where the mobile terminals operate in a Long Term Evolution (LTE)-based network.

8. The method of claim 1, further comprising:
  calculating, by each of the mobile terminals and based on the respective last hexadecimal value of the MSIN and the selected backoff period definition, a particular backoff period for each of the mobile terminals; and
  sending, by each of the mobile terminals and to the base station, radio resource control (RRC) connection requests using the calculated backoff period.

9. A device, comprising:
  a memory to store a plurality of instructions; and
  a processor to execute instructions in the memory to:
    store, in a memory, multiple backoff period definitions to control a sequence of radio resource control (RCC) connection requests from multiple classes of mobile terminals in a wireless access network, wherein the multiple classes are distinguished based on a last hexadecimal value of a Mobile Station Identification Number (MSIN) assigned to each of the mobile terminals;
    select, based on a particular network condition, one of the multiple backoff period definitions for the multiple classes;
    broadcast, via an overhead channel associated with the wireless access network, the selected backoff period definition, wherein the selected backoff period definition includes a class randomizer variable and wherein the selected backoff period definition is applied differently by different mobile terminals based on application of the MSIN to the class randomizer variable; and
    receive, from the mobile terminals, RCC re-access requests sequenced by different classes of the multiple classes based on the backoff period definition.

10. The device of claim 9, where the device comprises a base station for the wireless access network.

11. A system, comprising:
  a base station for a wireless access network, wherein the base station is configured to:
    store, in a memory, multiple backoff period definitions to control a sequence of radio resource control (RCC) connection requests from multiple classes of mobile terminals in the wireless access network, wherein the multiple classes are distinguished based on a value of a Mobile Station Identification Number (MSIN) assigned to each of the mobile terminals,
    select, based on a particular network condition, one of the multiple backoff period definitions for the multiple classes,
    broadcast the selected backoff period definition, wherein the selected backoff period definition includes a class randomizer variable and wherein the selected backoff period definition is applied differently by different mobile terminals based on application of the MSIN to the class randomizer variable, and
    receive, from the mobile terminals, RCC re-access requests sequenced by different classes of the multiple classes based on the selected backoff period definition; and
  each of the mobile terminals configured to:
    identify a class identifier for the mobile terminal, wherein the class identifier is based on the MSIN stored in a memory of the mobile terminal,
    calculate, based on the class identifier and the selected backoff period definition, a particular backoff period, and
    send, by the mobile terminal and to the base station, a RRC re-access request using the calculated backoff period.

12. The system of claim 11, wherein the base station is further configured to:
  broadcast the selected backoff period definition via an overhead channel associated with the wireless access network.

13. The system of claim 11, wherein each of the mobile terminals are further configured to:
  when calculating the particular backoff period, apply, to a variable of the backoff period definition, a value based on the class identifier.

14. The system of claim 11, wherein each of the mobile terminals are further configured to:
  when a response to the RRC re-access request is not received, send, to the base station, another RRC re-access request using the calculated backoff period.

* * * * *